United States Patent
Zhang et al.

(10) Patent No.: US 10,410,361 B2
(45) Date of Patent: Sep. 10, 2019

(54) MOVING OBJECT DETECTION METHOD AND SYSTEM

(71) Applicant: SOOCHOW UNIVERSITY, Suzhou (CN)

(72) Inventors: Li Zhang, Suzhou (CN); Tingwei Pei, Suzhou (CN); Bangjun Wang, Suzhou (CN); Zhao Zhang, Suzhou (CN); Fanzhang Li, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 48 days.

(21) Appl. No.: 15/737,155

(22) PCT Filed: Dec. 7, 2016

(86) PCT No.: PCT/CN2016/108836
§ 371 (c)(1),
(2) Date: Dec. 15, 2017

(87) PCT Pub. No.: WO2018/032660
PCT Pub. Date: Feb. 22, 2018

(65) Prior Publication Data
US 2018/0365845 A1    Dec. 20, 2018

(30) Foreign Application Priority Data

Aug. 19, 2016 (CN) .......................... 2016 1 0692267

(51) Int. Cl.
*G06T 7/00* (2017.01)
*G06T 7/254* (2017.01)
*G06T 7/231* (2017.01)

(52) U.S. Cl.
CPC .............. *G06T 7/254* (2017.01); *G06T 7/231* (2017.01); *G06T 2207/10016* (2013.01); *G06T 2207/20021* (2013.01)

(58) Field of Classification Search
None
See application file for complete search history.

(56) References Cited

FOREIGN PATENT DOCUMENTS

| CN | 101510358 A | 8/2009 |
|---|---|---|
| CN | 101587646 A | 11/2009 |

(Continued)

OTHER PUBLICATIONS

Wang, "Research of Object Detection and Tracking Based on Sparse Representation and Compressed Sensing", Xiamen University Master's Theses, published on Aug. 15, 2014.

(Continued)

*Primary Examiner* — Delomia L Gilliard
(74) *Attorney, Agent, or Firm* — SZDC Law P.C.

(57) ABSTRACT

A moving object detection method and a moving object detection system are provided. The method includes: predetermining a background image corresponding to a scene monitored by a video monitoring device; performing a subtraction processing on a grayscale image to be detected and the background image to acquire a difference image; and binarizing the difference image and determining a moving object in the grayscale image to be detected, where the determining the background image includes: dividing a first grayscale image frame and a second grayscale image frame in a grayscale image frame sequence captured by the video monitoring device into image blocks to acquire a first image block set and a second image block set respectively, and determining the background image using a difference between the first image block set and the second image block set.

10 Claims, 1 Drawing Sheet

(56) References Cited

FOREIGN PATENT DOCUMENTS

| CN | 2010-M46961 | * | 2/2010 |
|---|---|---|---|
| CN | 101827204 A | | 9/2010 |
| CN | 103700116 A | | 4/2014 |
| CN | 104700430 A | | 6/2015 |
| KR | 20110128529 A | | 11/2011 |

OTHER PUBLICATIONS

Zhang et al., "Fast Moving Object Extraction Algorithm in Image Sequences", Journal of Beijing University of Technology, vol. 38, No. 12, Dec. 31, 2012.
Jiwoong Bang et al, "Motion Object and Regional Detection Method Using Block-based Background Difference Video Frames", Embedded and Real-Time Computing Systems and Applications (PTCSA), 2012, IEEE 19th International Conference on, IEEE, Aug. 19, 2012 (Aug. 19, 2102), pp. 350-357.

* cited by examiner

MOVING OBJECT DETECTION METHOD AND SYSTEM

This application is the national phase of International Application No. PCT/CN2016/108836, titled "MOVING OBJECT DETECTION METHOD AND SYSTEM," filed on Dec. 7, 2016, which claims priority to Chinese Patent Application No. 201610692267.0, titled "MOVING OBJECT DETECTION METHOD AND SYSTEM," filed on Aug. 19, 2016 with the State Intellectual Property Office of People's Republic of China, both of which are incorporated herein by reference in their entireties.

FIELD

The present disclosure relates to the technical field of monitoring picture processing, and in particular to a moving object detection method and a moving object detection system.

BACKGROUND

With rapid development of the computer technology and continuous reduction of costs of various monitoring devices, video monitoring systems are extensively applied in fields of finance, transportation, military and the like. The technology for detecting and tracking a moving object in a video sequence has been an important research subject in the computer vision field.

In recent years, many scholars have proposed solutions for moving object detection, such as the Gaussian mixture model algorithm (GMM), the codebook algorithm (Codebook), the visual background extraction algorithm (Vibe) and the GMG algorithm. According to the Gaussian mixture model algorithm, multiple independent Gaussian distributions are established for each pixel, thus a moving object in a complex scene can be well extracted. However, this algorithm requires time for training samples. In addition, it is difficult to establish an effective background model using the Gaussian mixture model algorithm in a case that the lighting condition changes abruptly since parameters are fixed. According to the codebook algorithm, a codebook structure is established for each pixel, thereby providing a good real-time performance. However, a large amount of memory is occupied, and the algorithm is susceptible to subtle disturbances in the background. The visual background extraction algorithm adopts a random sample model, thus a complete moving object can be rapidly extracted, and the algorithm has certain immunity to noises. However, the disadvantages of the algorithm includes that, sample values of the background model are repeatedly selected, a fixed segmentation threshold cannot adapt to dynamic change of the background in a complex video scene, and noises caused by changes of the lighting cannot be effectively eliminated using the fixed updating factor. The GMG algorithm is a non-parametric method, which generates a time-varying background model using the Bayesian inference. The algorithm shows a poor performance in a lighting-varying scene.

As can be seen, a process of detecting a moving object in a video monitoring picture according to the conventional technology is relatively cumbersome and a detection effect needs further improvement.

In view of the above, problems to be solved include how to improve the effect of moving object detection and how to reduce the complexity of the detection process.

SUMMARY

In view of this, the purpose of the present disclosure is to provide a moving object detection method and a moving object detection system, with which a effect of moving object detection can be improved and the complexity of a detection process can be reduced. The solution is as follows.

A moving object detection method is provided, which includes:

predetermining a background image corresponding to a scene monitored by a video monitoring device;

performing a subtraction processing on a grayscale image to be detected and the background image to acquire a difference image; and binarizing the difference image and determining a moving object in the grayscale image to be detected, where the determining the background image includes:

dividing a first grayscale image frame and a second grayscale image frame in a grayscale image frame sequence captured by the video monitoring device into image blocks to acquire a first image block set and a second image block set respectively, and determining the background image using a difference between the first image block set and the second image block set.

Preferably, a time instant at which the grayscale image to be detected is captured may be greater than or equal to a time instant at which the first grayscale image frame is captured, the time instant at which the first grayscale image frame is captured may be greater than a time instant at which the second grayscale image frame is captured, and there may be N grayscale image frames between the first grayscale image frame and the second grayscale image frame, where N is a positive integer.

Preferably, the dividing the first grayscale image frame and the second grayscale image frame in the grayscale image frame sequence captured by the video monitoring device into image blocks may include:

dividing the first grayscale image frame into K image blocks which do not overlap with each other and include all pixels in the first grayscale image frame, to acquire the first image block set, and dividing the second grayscale image frame into K image blocks which do not overlap with each other and include all pixels in the second grayscale image frame, to acquire the second image block set, where K is a positive integer, the image blocks have the same size, and the K image blocks in the first image block set have a one-to-one correspondence with the K image blocks in the second image block set.

Preferably, the determining the background image using the difference between the first image block set and the second image block set may include:

calculating the difference between the first image block set and the second image block set; and acquiring the background image using the difference and the first image block set.

Preferably, the calculating the difference between the first image block set and the second image block set may include:

calculating an image block grayscale difference between each image block in the first image block set and a corresponding image block in the second image block set, to acquire an image block grayscale difference set, where an i-th element in the image block grayscale difference set is calculated according to an equation:

$$d_i = |g_{t,i} - g_{t-N,i}|,$$

where $g_{t,i}$ represents an i-th image block in the first image block set, which is represented by $g_t$, $g_{t-N,i}$ represents an i-th image block in the second image block set, which is represented by $g_{t-N}$, and $d_i$ represents an image block grayscale difference between the i-th image block in the first image block set and the i-th image block in the second image block set, where i=1, 2, . . . , K; and calculating a difference between each image block in the first image block set and a corresponding image block in the second image block set using the image block grayscale difference set to acquire a difference set, where an i-th element in the difference set is calculated according to an equation:

$$s_i = \sum_{1 \le x \le n, 1 \le y \le m} d_i(x, y),$$

where n represents the length of each image block, m represents the width of each image block, both n and m are in units of pixels, $d_i(x,y)$ represents a grayscale difference in $d_i$ corresponding to an (x,y)-th pixel in the image block, and $s_i$ represents a difference between an i-th image block in the first image block set and an i-th image block in the second image block set.

Preferably, the acquiring the background image using the difference and the first image block set may include:

converting the difference set to a determination set using a preset conversion equation:

$$w_i = \begin{cases} 1, & s_i \le TH_1 \\ 0, & \text{else} \end{cases},$$

where $TH_1$ represents a preset difference threshold, and $w_i$ represents an i-th determination element in the determination set; and inputting the determination set and the first image block set into a preset first background image construction equation to acquire the background image, where the first background image construction equation is expressed as:

$$b_i = \begin{cases} g_{t,i}, & w_i = 1 \\ b_i', & w_i = 0 \end{cases},$$

where $b_i$ represents an i-th image block in the background image, and $b_i'$ represents an i-th image block in a previous background image.

Preferably, the acquiring the background image using the difference and the first image block set may include:

inputting the difference set and the first image block set into a preset second background image construction equation to acquire the background image, where the second background image construction equation is expressed as:

$$b_i = \begin{cases} g_{t,i}, & s_i \le TH_1 \\ b_i', & \text{else} \end{cases},$$

where $TH_1$ represents a preset difference threshold, $b_i$ represents an i-th image block in the background image, and $b_i'$ represents an i-th image block in a previous background image.

Preferably, in a case that the previous background image is a first background image, the first background image may be an image in which grayscale values of all pixels are 0.

Preferably, the binarizing the difference image and determining the moving object in the grayscale image to be detected may include:

binarizing the difference image using a preset binarization processing equation to acquire a binarized image, where the binarization processing equation is expressed as:

$$F'(p, q) = \begin{cases} 0, & F(p, q) \le TH_2 \\ 255, & \text{else} \end{cases},$$

where $TH_2$ represents a preset grayscale threshold, F(p,q) represents a grayscale value corresponding to a (p,q)-th pixel in the difference image, which is represented by F, and F'(p,q) represents a grayscale value corresponding to a (p,q)-th pixel in the binarized image; and extracting pixels of which grayscale values are 255 from the binarized image to acquire the moving object in the grayscale image to be detected.

A moving object detection system is further provided according to the present disclosure, which includes:

a background image determination module, configured to predetermine a background image corresponding to a scene monitored by a video monitoring device;

a difference image acquisition module, configured to perform a subtraction processing on a grayscale image to be detected and the background image to acquire a difference image; and a moving object determination module, configured to binarize the difference image and determine a moving object in the grayscale image to be detected, where the background image determination module being configured to determine the background image includes:

the background image determination module being configured to divide a first grayscale image frame and a second grayscale image frame in a grayscale image frame sequence captured by the video monitoring device into image blocks to acquire a first image block set and a second image block set respectively, and determine the background image using a difference between the first image block set and the second image block set.

In the present disclosure, two grayscale image frames in the captured grayscale image frame sequence are divided into image blocks in advance, and the background image is determined using the difference between two image block sets acquired by division. As can be seen, the background image is determined based on the difference between the image blocks according to the present disclosure. As compared with the scheme of determining the background image based on the difference between pixels, the data processing amount is greatly reduced according to the present disclosure. Moreover, according to the present disclosure, the image frames for constructing the background image are grayscale image frames. Therefore, the overall data processing amount for determining the background image is small, since grayscale images contain less information, which is beneficial for reducing the complexity of moving object detection. Further, after the background image is determined, according to the present disclosure, the subtraction processing is performed on a grayscale image to be detected and the above background image to acquire a difference image, and the difference image is binarized, so as to determine a moving object in the above grayscale image to be detected. As can be seen, according to the present disclosure, during construction of the background image, calculation of the difference image and binarization, all the processed data is grayscale data, thus the capability of the moving object detection process according to the present disclosure of rejecting external interference factors can be improved, thereby improving the effect of moving object detection. In summary, the effect of the moving object detection is improved and the complexity of the detection process is reduced according to the present disclosure.

DETAILED DESCRIPTION OF EMBODIMENTS

Technical solutions according to embodiments of the present disclosure are described clearly and completely hereinafter in conjunction with drawings used in the embodiments of the present disclosure. Apparently, the described embodiments are only some embodiments of the present disclosure rather than all the embodiments. Any other embodiments obtained by those skilled in the art based on the embodiments of the present disclosure without any creative work fall in the scope of protection of the present disclosure.

Figure 1:
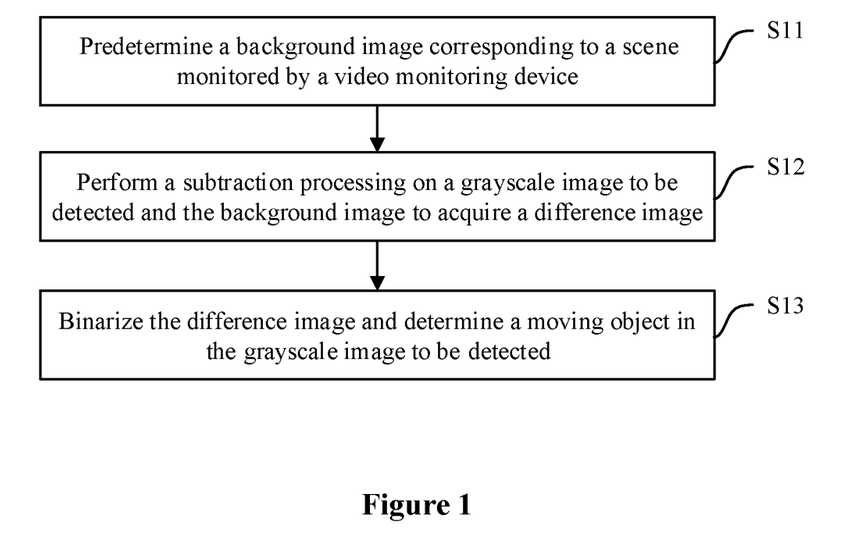
FIG. 1 is a flow chart of a moving object detection method according to an embodiment of the present disclosure.

A moving object detection method is provided according to an embodiment of the present disclosure. As shown in FIG. 1, the method includes the following steps S11 to S13.

In step S11, a background image corresponding to a scene monitored by a video monitoring device is predetermined. Specifically, the determining the background image includes: dividing a first grayscale image frame and a second grayscale image frame in a grayscale image frame sequence captured by the video monitoring device into image blocks to acquire a first image block set and a second image block set respectively, and determining the background image using a difference between the first image block set and the second image block set.

In this embodiment, the above first grayscale image frame and the above second grayscale image frame are two grayscale image frames in the above captured grayscale image frame sequence. In this embodiment, during determination of the background image, first, the above first grayscale image frame and the above second grayscale image frame are divided into image blocks, that is, the above first grayscale image frame and the above second grayscale image frame are divided into multiple image blocks, to acquire the first image block set and the second image block set respectively. It should be understood that image blocks in the above two image block sets are grayscale image blocks; and then, the above background image is determined using the difference between the above two image block sets, that is, using the difference between the grayscales of the two image block sets.

It should be further noted that, in this embodiment, the background image may be determined only once in a case that fewer changes occur in the monitored scene. For example, in a case of monitoring a school gate in the forenoon, the determination of the background image is performed only once in order to reduce the data processing amount, since teachers and students usually have classes in this time period, which leads to a small number of moving vehicles and people at the school gate. When a moving object in monitoring pictures in the forenoon is detected, the same background image is used. In a case that the monitored scene changes frequently, a previous background image may be updated regularly to acquire the current background image, and subsequent moving object detection is performed using the current background image. For example, the above first grayscale image frame and the above second grayscale image frame may be updated regularly, then the previous background image is updated using the updated first grayscale image frame and the updated second grayscale image frame to acquire the current background image.

Further, it should be understood that, each of the above first image block set and the above second image block set acquired by performing image block division includes multiple image blocks, where each image block includes multiple pixels. In order to reduce the data processing amount throughout the detection process and ensure good detection effect, the size of each image block in the embodiments of the present disclosure should be neither too large nor too small. For example, the size of each image block in the embodiments of the present disclosure may be set to 16 pixels by 16 pixels. Of course, the size of each image block may also be increased or reduced according to actual conditions, and the size of the image block is not limited in this embodiment. Further, the image blocks in the above first image block set have a one-to-one correspondence with the image blocks in the above second image block set. It should be understood that, in the above first image block set and the above second image block set, any two corresponding image blocks have the same size, and two image blocks which are not corresponding to each other may have different sizes, or may have the same size. This means that, in either image block set, different image blocks may have the same size or different sizes. According to the embodiment of the present disclosure, the difference between the above two image block sets may be determined by determining a difference between the corresponding image blocks in the above two image block sets.

In step S12, a subtraction processing is performed on a grayscale image to be detected and the background image to acquire a difference image.

In this embodiment, a time instant at which the above grayscale image to be detected is captured is generally greater than a time instant at which the above first grayscale image frame is captured and a time instant at which the above second grayscale image frame is captured. That is, the time instant at which the above first grayscale image frame is captured and the time instant at which the above second grayscale image frame is captured are earlier than the time instant at which the grayscale image to be detected is captured. Of course, in this embodiment, the above grayscale image to be detected can also be used to determine the above background image. That is, the above grayscale image to be detected can be used as the above first grayscale image frame or the above second grayscale image frame. In this case, the above first grayscale image frame or the above second grayscale image frame is the same image frame as the above grayscale image to be detected. Further, in a case that fewer changes occur in the monitored scene, the time instant at which the above grayscale image to be detected is captured may also be less than the time instant at which the above first grayscale image frame is captured and/or the time instant at which the above second grayscale image frame is captured.

Further, it should be noted that, the performing the subtraction processing on the grayscale image to be detected and the background image refers to performing subtraction between a grayscale value of a pixel in the grayscale image to be detected and a corresponding pixel in the background image, and acquiring an absolute value of each subtraction result, thereby acquiring the above difference image.

In step S13, the difference image is binarized and a moving object in the grayscale image to be detected is determined.

Generally, when the above difference image is binarized, grayscale values of pixels in an area which is suspected to be a moving object are set to 255, grayscale values of pixels in an area which is suspected to be a static background is set to 0, and all the pixels of which the grayscale values are 255 are extracted, thereby acquiring a moving area in the grayscale image to be detected. Alternatively, according to the embodiment of the present disclosure, the binarization of the above difference image may include setting the grayscale values of the pixels in the area which is suspected to be a moving object to 0, setting the grayscale values of the pixels in the area which is suspected to be a static background to 255, and extracting all the pixels of which the grayscale values are 0, thereby determining the moving area in the grayscale image to be detected. Alternatively, in this embodiment, the grayscale values of the pixels in the area which is suspected to be a moving object may be set to a value A, the grayscale values of the pixels in the area which is suspected to be a static background may be set to a value B, and all the pixels of which the grayscale values are value A are extracted to acquire the moving area in the grayscale image to be detected. It should be understood that, the above value A and the above value B are different values, and both the value A and the value B are less than or equal to 255, and greater than or equal to 0.

In the embodiment of the present disclosure, two grayscale image frames in the captured grayscale image frame sequence are divided into image blocks in advance, and the background image is determined using the difference between two image block sets acquired by division. As can be seen, the background image is determined based on the difference between the image blocks according to the embodiment of the present disclosure. As compared with the scheme of determining the background image based on the difference between pixels, the data processing amount is greatly reduced according to the embodiment of the present disclosure. Moreover, according to the embodiment of the present disclosure, the image frames for constructing the background image are grayscale image frames. Therefore, the overall data processing amount for determining the background image is small, since grayscale images contain less information, which is beneficial for reducing the complexity of moving object detection. Further, after the background image is determined, according to the embodiment of the present disclosure, the subtraction processing is performed on a grayscale image to be detected and the above background image to acquire a difference image, and the difference image is binarized, so as to determine a moving object in the above grayscale image to be detected. As can be seen, according to the embodiment of the present disclosure, during construction of the background image, calculation of the difference image and binarization, all the processed data is grayscale data, thus the capability of the moving object detection process according to the present disclosure of rejecting external interference factors can be improved, thereby improving the effect of moving object detection. In summary, the effect of the moving object detection is improved and the complexity of the detection process is reduced according to the embodiment of present disclosure.

A specific moving object detection method is provided according to an embodiment of the present disclosure. As compared with the above embodiment, the technical solution is further described and optimized in this embodiment.

In the above embodiment, it is required to predetermine the background image using the first grayscale image frame and the second grayscale image frame, and perform the subtraction processing on the grayscale image to be detected and the above background image, to acquire the difference image. In this embodiment, a time instant at which the above grayscale image to be detected is captured is greater than or equal to a time instant at which the above first grayscale image frame is captured, and the time instant at which the above first grayscale image frame is captured is greater than a time instant at which the above second grayscale image frame is captured. That is, the time instant at which the above grayscale image to be detected is captured is later than or the same as the time instant at which the above first grayscale image frame is captured, and the time instant at which the above first grayscale image frame is captured is later than the time instant at which the above second grayscale image frame is captured. Moreover, there are N grayscale image frames between the above first grayscale image frame and the above second grayscale image frame, where N is a positive integer. For example, there are 40 grayscale image frames between the above first grayscale image frame and the above second grayscale image frame. Of course, a value of the above N may also be increased or reduced according to actual conditions, which is not limited in the present disclosure.

In the above embodiment, during determination of the background image, the first grayscale image frame and the second grayscale image frame in the grayscale image frame sequence captured by the video monitoring device are divided into image blocks, and the background image is determined using the difference between the first image block set and the second image block set which are acquired by division. In this embodiment, the process of dividing the above first grayscale image frame and the above second grayscale image frame is as follows.

The first grayscale image frame is divided into K image blocks which do not overlap with each other and include all pixels in the first grayscale image frame, to acquire the first image block set, and the second grayscale image frame is divided into K image blocks which do not overlap with each other and include all pixels in the second grayscale image frame, to acquire the second image block set, where K is a positive integer, the image blocks has the same size, and the K image blocks in the first image block set have a one-to-one correspondence with the K image blocks in the second image block set. Of course, in a same image block set, different image blocks may have different sizes, as long as it is ensured that the size of an image block in the above first image block set is the same as the size of a corresponding image block in the above second image block set.

Further, specifically, in this embodiment, the determining the background image using the difference between the first image block set and the second image block set includes the following steps S01 and S02.

In step S01, the difference between the first image block set and the second image block set is calculated.

In step S02, the background image is acquired using the above difference and the first image block set.

More specifically, in the above step S01, the calculating the difference between the first image block set and the second image block set includes the following steps S011 and S012.

In step S011, an image block grayscale difference between each image block in the first image block set and a corresponding image block in the second image block set is calculated, to acquire an image block grayscale difference set. An i-th element in the image block grayscale difference set is calculated according to the following equation:

$$d_i = |g_{t,i} - g_{t-N,i}|.$$

In the equation, $g_{t,i}$ represents an i-th image block in the first image block set, which is represented by $g_t$, $g_{t-N,i}$ represents an i-th image block in the second image block set, which is represented by $g_{t-N}$, and $d_i$ represents an image block grayscale difference between the i-th image block in the first image block set and the i-th image block in the second image block set, where i=1, 2, . . . , K.

In step S012, a difference between each image block in the first image block set and a corresponding image block in the second image block set is calculated using the image block grayscale difference set to acquire a difference set. An i-th element in the difference set is calculated according to the following equation:

$$s_i = \sum_{1 \leq x \leq n, 1 \leq y \leq m} d_i(x, y).$$

In the equation, n represents the length of each image block, m represents the width of each image block, both n and m are in units of pixels. In this embodiment, the above n and m may be set to 16. $d_i(x,y)$ represents a grayscale difference in $d_i$ corresponding to an (x,y)-th pixel in the image block, and $s_i$ represents a difference between an i-th image block in the first image block set and an i-th image block in the second image block set.

Further, specifically, in the above step S02, the acquiring the background image using the difference and the first image block set includes the following steps S021 and S022.

In step S021, the difference set is converted to a determination set using the following preset conversion equation:

$$w_i = \begin{cases} 1, & s_i \leq TH_1 \\ 0, & \text{else} \end{cases}.$$

In the equation, $TH_1$ represents a preset difference threshold. In a case that both the above n and m are set to 16, $TH_1$ may be set to 500 in this embodiment. It should be understood that, a value of $TH_1$ in this embodiment may vary with the sizes of different image blocks, and $w_i$ in the above equation represents an i-th determination element in the determination set.

In step S022, the determination set and the first image block set are inputted into a preset first background image construction equation to acquire the background image. The first background image construction equation is expressed as follows:

$$b_i = \begin{cases} g_{t,i}, & w_i = 1 \\ b'_i, & w_i = 0 \end{cases}.$$

In the equation, $b_i$ represents an i-th image block in the background image, and $b'_i$ represents an i-th image block in a previous background image.

As can be seen, in the above step S02, the above difference set is converted to the determination set according to the preset conversion equation, and the background image is determined based on the determination set and the above first image block set. The determination of the above determination set facilitates determination of which image blocks in the first image block set are to be used as the content of the background image, and which image blocks are not to be used as the content of the background image. However, it is to be noted that the above determination set plays only an auxiliary interim role in the determination of the background image, and is not a necessity. For example, in the above step S02, the background image may be acquired in a manner described in the following step S023.

In step S023, the difference set and the first image block set are inputted into a preset second background image construction equation to acquire the background image. The second background image construction equation is expressed as follows:

$$b_i = \begin{cases} g_{t,i}, & s_i \leq TH_1 \\ b'_i, & \text{else} \end{cases}.$$

In the equation, $TH_1$ represents a preset difference threshold, $b_i$ represents an i-th image block in the background image, and $b'_i$ represents an i-th image block in a previous background image.

Further, in a case that the previous background image mentioned in the above step S022 or step S023 is a first background image, the first background image is an image in which grayscale values of all the pixels are 0. The image in which the grayscale values of all the pixels are 0 is a full black image. That is, in this embodiment, the originally established background image is a full black image.

In addition, in step S13 in the above embodiment, the binarizing the difference image and determining the moving object in the grayscale image to be detected includes the following steps S131 and S132.

In step S131, the difference image is binarized using a preset binarization processing equation to acquire a binarized image. The binarization processing equation is expressed as follows:

$$F'(p, q) = \begin{cases} 0, & F(p, q) \leq TH_2 \\ 255, & \text{else} \end{cases}.$$

In the equation, $TH_2$ represents a preset grayscale threshold, $F(p,q)$ represents a grayscale value corresponding to a (p,q)-th pixel in the difference image, which is represented by F, and $F'(p,q)$ represents a grayscale value corresponding to a (p,q)-th pixel in the binarized image.

In step S132, pixels of which grayscale values are 255 are extracted from the binarized image to acquire the moving object in the grayscale image to be detected.

Figure 2:
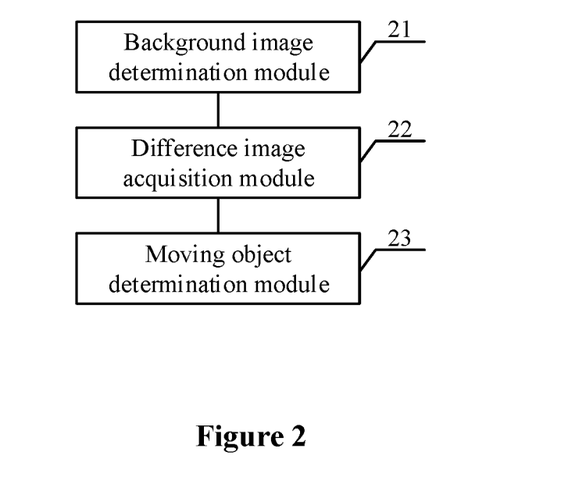
FIG. 2 is schematic structural diagram of a moving object detection system according to an embodiment of the present disclosure.

Correspondingly, a moving object detection system is provided according to the embodiment of the present disclosure. As shown in FIG. 2, the system includes a background image determination module 21, a difference image acquisition module 22 and a moving object determination module 23.

The background image determination module 21 is configured to predetermine a background image corresponding to a scene monitored by a video monitoring device.

The difference image acquisition module 22 is configured to perform a subtraction processing on a grayscale image to be detected and the background image to acquire a difference image.

The moving object determination module 23 is configured to binarize the difference image and determine a moving object in the grayscale image to be detected.

Specifically, the background image determination module 21 being configured to determine the background image includes: the background image determination module being configured to divide a first grayscale image frame and a second grayscale image frame in a grayscale image frame sequence captured by the video monitoring device into image blocks to acquire a first image block set and a second image block set respectively, and determine the background image using a difference between the first image block set and the second image block set.

One can refer to corresponding content disclosed in the above embodiments for more detailed operation processes of the above modules, which is not repeated herein.

In the embodiment of the present disclosure, two grayscale image frames in the captured grayscale image frame sequence are divided into image blocks in advance, and the background image is determined using the difference between two image block sets acquired by division. As can be seen, the background image is determined based on the difference between the image blocks according to the embodiment of the present disclosure. As compared with the scheme of determining the background image based on the difference between pixels, the data processing amount is greatly reduced according to the embodiment of the present disclosure. Moreover, according to the embodiment of the present disclosure, the image frames for constructing the background image are grayscale image frames. Therefore, the overall data processing amount for determining the background image is small, since grayscale images contain less information, which is beneficial for reducing the complexity of moving object detection. Further, after the background image is determined, according to the embodiment of the present disclosure, the subtraction processing is performed on a grayscale image to be detected and the above background image to acquire a difference image, and the difference image is binarized, so as to determine a moving object in the above grayscale image to be detected. As can be seen, according to the embodiment of the present disclosure, during construction of the background image, calculation of the difference image and binarization, all the processed data is grayscale data, thus the capability of the moving object detection process according to the present disclosure of rejecting external interference factors can be improved, thereby improving the effect of moving object detection. In summary, the effect of the moving object detection is improved and the complexity of the detection process is reduced according to the embodiment of present disclosure.

Finally, it should be further noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The moving object detection method and the moving object detection system according to the present disclosure are described in detail above. The principles and implementations are clarified using specific embodiments herein. The above description of the embodiments is only intended to help understanding the method of the present disclosure and the key concept thereof. In addition, changes can be made to the specific embodiments and the application scope by those skilled in the art based on the concept of the present disclosure. In summary, the specification should not be interpreted as limitation to the present disclosure.

The invention claimed is:

1. A moving object detection method, comprising:
   predetermining a background image corresponding to a scene monitored by a video monitoring device;
   performing a subtraction processing on a grayscale image to be detected and the background image to acquire a difference image; and
   binarizing the difference image and determining a moving object in the grayscale image to be detected,
   wherein the determining the background image comprises:
      dividing the first grayscale image frame into K image blocks which do not overlap with each other and include all pixels in the first grayscale image frame, to acquire the first image block set, and dividing the second grayscale image frame into K image blocks which do not overlap with each other and include all pixels in the second grayscale image frame, to acquire the second image block set, wherein K is a positive integer, the image blocks have the same size, and the K image blocks in the first image block set have a one-to-one correspondence with the K image blocks in the second image block set,
      calculating the difference between the first image block set and the second image block set, and
      acquiring the background image using the difference and the first image block set.

2. The moving object detection method according to claim 1, wherein a time instant at which the grayscale image to be detected is captured is greater than or equal to a time instant at which the first grayscale image frame is captured, the time instant at which the first grayscale image frame is captured is greater than a time instant at which the second grayscale image frame is captured, and there are N grayscale image frames between the first grayscale image frame and the second grayscale image frame, wherein N is a positive integer.

3. The moving object detection method according to claim 1, wherein the calculating the difference between the first image block set and the second image block set comprises:
   calculating an image block grayscale difference between each image block in the first image block set and a corresponding image block in the second image block set, to acquire an image block grayscale difference set, wherein an i-th element in the image block grayscale difference set is calculated according to an equation:

$$d_i = |g_{t,i} - g_{t-N,i}|,$$

wherein $g_{t,i}$ represents an i-th image block in the first image block set, which is represented by $g_t$, $g_{t-N,i}$ represents an i-th image block in the second image block set, which is represented by $g_{t-N}$, and $d_i$ represents an image block grayscale difference between the i-th image block in the first image block set and the i-th image block in the second image block set, wherein Z=1, 2, . . . , K; and calculating a difference between each image block in the first image block set and a corresponding image block in the second image block set using the image block grayscale difference set to acquire a difference set, wherein an i-th element in the difference set is calculated according to an equation:

$$s_i = \sum_{1 \le x \le n, 1 \le y \le m} d_i(x, y),$$

wherein n represents the length of each image block, m represents the width of each image block, both n and m are in units of pixels, $d_i$ (x, y) represents a grayscale difference in $d_i$ corresponding to an (x, y)-th pixel in the image block, and $s_i$ represents a difference between an i-th image block in the first image block set and an i-th image block in the second image block set.

4. The moving object detection method according to claim 3, wherein the acquiring the background image using the difference and the first image block set comprises:

converting the difference set to a determination set using a preset conversion equation:

$$w_i = \begin{cases} 1, & s_i \le TH_1 \\ 0, & \text{else} \end{cases},$$

wherein $TH_1$ represents a preset difference threshold, and $w_i$ represents an i-th determination element in the determination set; and inputting the determination set and the first image block set into a preset first background image construction equation to acquire the background image, wherein the first background image construction equation is expressed as:

$$b_i = \begin{cases} g_{t,i}, & w_i = 1 \\ b'_i, & w_i = 0 \end{cases},$$

wherein $b_i$ represents an i-th image block in the background image, and $b'_i$ represents an i-th image block in a previous background image.

5. The moving object detection method according to claim 3, wherein the acquiring the background image using the difference and the first image block set comprises:

inputting the difference set and the first image block set into a preset second background image construction equation to acquire the background image, wherein the second background image construction equation is expressed as:

$$b_i = \begin{cases} g_{t,i}, & s_i \le TH_1 \\ b'_i, & \text{else} \end{cases},$$

wherein $TH_1$ represents a preset difference threshold, $b_i$ represents an i-th image block in the background image, and $b'_i$ represents an i-th image block in a previous background image.

6. The moving object detection method according to claim 4, wherein in a case that the previous background image is a first background image, the first background image is an image in which grayscale values of all pixels are 0.

7. The moving object detection method according to claim 4, wherein the binarizing the difference image and determining the moving object in the grayscale image to be detected comprises:

binarizing the difference image using a preset binarization processing equation to acquire a binarized image, wherein the binarization processing equation is expressed as:

$$F'(p, q) = \begin{cases} 0, & F(p, q) \le TH_2 \\ 255, & \text{else} \end{cases},$$

wherein $TH_2$ represents a preset grayscale threshold, F(p,q) represents a grayscale value corresponding to a (p,q)-th pixel in the difference image, which is represented by F, and F'(p,q) represents a grayscale value corresponding to a (p,q)-th pixel in the binarized image; and extracting pixels of which grayscale values are 255 from the binarized image to acquire the moving object in the grayscale image to be detected.

8. A moving object detection system, comprising:

a background image determination module, configured to predetermine a background image corresponding to a scene monitored by a video monitoring device;

a difference image acquisition module, configured to perform a subtraction processing on a grayscale image to be detected and the background image to acquire a difference image; and a moving object determination module, configured to binarize the difference image and determine a moving object in the grayscale image to be detected, wherein the background image determination module being configured to determine the background image comprises:

the background image determination module being configured to divide the first grayscale image frame into K image blocks which do not overlap with each other and include all pixels in the first grayscale image frame, to acquire the first image block set, and divide the second grayscale image frame into K image blocks which do not overlap with each other and include all pixels in the second grayscale image frame, to acquire the second image block set, wherein K is a positive integer, the image blocks have the same size, and the K image blocks in the first image block set have a one-to-one correspondence with the K image blocks in the second image block set, calculate the difference between the first image block set and the second image block set, and acquire the background image using the difference and the first image block set.

9. The moving object detection method according to claim 5, wherein in a case that the previous background image is a first background image, the first background image is an image in which grayscale values of all pixels are 0.

10. The moving object detection method according to claim 5, wherein the binarizing the difference image and determining the moving object in the grayscale image to be detected comprises:
  binarizing the difference image using a preset binarization processing equation to acquire a binarized image, wherein the binarization processing equation is expressed as:

$$F'(p, q) = \begin{cases} 0, & F(p, q) \leq TH_2 \\ 255, & \text{else} \end{cases},$$

wherein $TH_2$ represents a preset grayscale threshold, $F(p,q)$ represents a grayscale value corresponding to a $(p,q)$-th pixel in the difference image, which is represented by F, and $F'(p,q)$ represents a grayscale value corresponding to a $(p,q)$-th pixel in the binarized image; and
  extracting pixels of which grayscale values are 255 from the binarized image to acquire the moving object in the grayscale image to be detected.

* * * * *